United States Patent
Su et al.

(10) Patent No.: US 12,104,517 B2
(45) Date of Patent: Oct. 1, 2024

(54) TREATED SCR CATALYSTS WITH ENHANCED SULFUR RESISTANCE

(71) Applicant: Cummins Emission Solutions Inc., Columbus, IN (US)

(72) Inventors: Changsheng C. Su, Columbus, IN (US); Yuanzhou Xi, Verona, WI (US); Jinqian Gong, Columbus, IN (US); Ramakrishna Gopal Dontha, Columbus, IN (US); Nathan A. Ottinger, Lenoir City, TN (US); Z. Gerald Liu, Madison, WI (US); James C. Clerc, Columbus, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 322 days.

(21) Appl. No.: 17/423,823

(22) PCT Filed: Jan. 10, 2020

(86) PCT No.: PCT/US2020/013052
§ 371 (c)(1),
(2) Date: Jul. 16, 2021

(87) PCT Pub. No.: WO2020/150087
PCT Pub. Date: Jul. 23, 2020

(65) Prior Publication Data
US 2022/0112824 A1    Apr. 14, 2022

Related U.S. Application Data

(60) Provisional application No. 62/794,332, filed on Jan. 18, 2019.

(51) Int. Cl.
*F01N 3/20*      (2006.01)
*B01J 6/00*      (2006.01)
*B01J 29/72*      (2006.01)

(52) U.S. Cl.
CPC .............. *F01N 3/208* (2013.01); *B01J 6/001* (2013.01); *B01J 29/723* (2013.01); *F01N 2570/14* (2013.01)

(58) Field of Classification Search
CPC . B01J 6/001; B01J 29/06; B01J 29/061; B01J 29/072; B01J 29/723; B01J 29/763;
(Continued)

(56) References Cited

U.S. PATENT DOCUMENTS

| | | | |
|---|---|---|---|
| 5,024,981 | A | 6/1991 | Speronello et al. |
| 9,624,803 | B2 | 4/2017 | Kumar et al. |

(Continued)

FOREIGN PATENT DOCUMENTS

| | | |
|---|---|---|
| CN | 104475122 A | 4/2015 |
| CN | 104667915 A | 6/2015 |
| CN | 107185588 A | 9/2017 |

OTHER PUBLICATIONS

Lantto, "Sulfur tolerance of SCR catalysts", Master's Thesis, 2017, Lulei University of Technology, 70 pages.*

(Continued)

*Primary Examiner* — Melissa S Swain
*Assistant Examiner* — Keling Zhang
(74) *Attorney, Agent, or Firm* — Foley & Lardner LLP

(57) ABSTRACT

A method includes: providing a SCR system comprising a SCR catalyst; heating the SCR system to a temperature greater than 500 degrees Celsius for a predetermined time so as to increase sulfur resistance of the SCR catalyst; and installing the SCR system in an aftertreatment system.

5 Claims, 7 Drawing Sheets

(58) Field of Classification Search
CPC ... B01J 37/30; B01J 37/10; B01J 37/08; B01J 37/105; B01J 37/0246; B01J 37/0248; B01J 37/024; Y02T 10/12; Y02T 10/40; F01N 3/18; F01N 3/20; F01N 3/2066; F01N 2570/14; F01N 2900/1402; F01N 2900/1614; F01N 2900/1812; F01N 2260/04; F01N 2610/146; B01D 53/9495; B01D 53/9477; B01D 53/9418; B01D 53/9413; B01D 53/94; B01D 53/92; B01D 53/96; B01D 2258/012; B01D 2255/50; B01D 2255/20761; B01D 2255/20738
USPC .............. 502/60, 64, 74; 423/239.1, 239.2
See application file for complete search history.

(56) References Cited

U.S. PATENT DOCUMENTS

| | | |
|---|---|---|
| 2002/0004446 A1 | 1/2002 | Fischer et al. |
| 2003/0108467 A1 | 6/2003 | Tran et al. |
| 2009/0257935 A1 | 10/2009 | Southward et al. |
| 2012/0141370 A1 | 6/2012 | Tokunaga |
| 2017/0107878 A1 | 4/2017 | Brown et al. |
| 2017/0234183 A1 | 8/2017 | Harinath et al. |
| 2017/0370263 A1 | 12/2017 | Heichelbech et al. |
| 2022/0112824 A1 | 4/2022 | Su et al. |

OTHER PUBLICATIONS

International Search Report and That issued for on PCT Application No. PCT/US2020/013052 Issued Feb. 27, 2020, 12 pages.
Luo, J., Wang, D., Kumar, A., Li, J., Kamasamudram, K., Currier, N., & Yezerets, A. (2016). Identification of two types of Cu sites in Cu/SSZ-13 and their unique responses to hydrothermal aging and sulfur poisoning. Catalysis Today, 267, 3-9.
Examination Report issued in UK Patent Application No. GB2110233.0 on Jan. 24, 2023.
Examination Report issued in UK Patent Application No. GB2110233.0, on Nov. 9, 2022.
Office Action issued in Chinese Patent Application No. 202080008731.4 on Jan. 5, 2023.
Office Action issued for Chinese Patent Application No. 202211571215.X issued Mar. 29, 2024.

* cited by examiner

TREATED SCR CATALYSTS WITH ENHANCED SULFUR RESISTANCE

CROSS-REFERENCE TO RELATED APPLICATIONS

The present application is a National Phase Application of PCT/US2020/013052, filed Jan. 10, 2020 which claims priority to and the benefit of U.S. Provisional Application No. 62/794,332, filed Jan. 18, 2019. The contents of these applications are hereby incorporated by reference in their entirety.

TECHNICAL FIELD

The present disclosure relates generally to aftertreatment systems for use with internal combustion (IC) engines.

BACKGROUND

Exhaust aftertreatment systems are used to receive and treat exhaust gas generated by IC engines. Generally, exhaust gas aftertreatment systems comprise any of several different components to reduce the levels of harmful exhaust emissions present in exhaust gas. Aftertreatment systems may also include a selective catalytic reduction (SCR) system including a SCR catalyst formulated to decompose constituents of the exhaust gas such as nitric oxides ($NO_x$) gases present in the exhaust gas in the presence of a reductant. The fuel being combusted by some IC engines may have a high sulfur content, which results in sulfur oxide ($SO_x$) gases being present in the exhaust gas. The sulfur in the $SO_x$ gases binds to the SCR catalyst and reduces a NOx conversion efficiency of the SCR catalyst.

SUMMARY

Embodiments described herein relate generally to SCR catalysts that have been aged or hydrothermally aged to increase their sulfur resistance, and in particular, to methods for aging of the SCR catalyst during the manufacturing process of the SCR catalyst, or after the SCR catalyst has been formed into a SCR system.

In some embodiments, a method comprises providing a SCR system comprising a SCR catalyst; heating the SCR system to a temperature greater than 500 degrees Celsius for a predetermined time so as to increase sulfur resistance of the SCR catalyst; and installing the SCR system in an aftertreatment system.

In some embodiments, the SCR catalyst comprises a metal-zeolite catalyst.

In some embodiments, the aging temperature is about 650 degrees Celsius.

In some embodiments, the heating is performed in the presence of water vapor.

In some embodiments, the heating of the SCR system comprises flowing a gas through the SCR system for the predetermined time, the gas having a temperature greater than 500 degrees Celsius and having a quantity of water vapor therein.

In some embodiments, the quantity of water vapor in the gas is in a range of 0.1 to 20%.

In some embodiments, a method for enhancing sulfur resistance of a SCR catalyst, comprises providing raw materials of the SCR catalyst; heating the raw materials to a temperature greater than 500 degrees Celsius for a predetermined time; forming the SCR catalyst from the raw materials; calcining the SCR catalyst; and forming the SCR catalyst into a SCR system.

In some embodiments, the SCR catalyst comprises a metal-zeolite catalyst.

In some embodiments, the temperature is about 650 degrees Celsius.

In some embodiments, the heating is performed in the presence of water vapor.

In some embodiments, the heating of the raw materials comprises flowing a gas through the SCR catalyst, the gas having a temperature greater than 500 degrees Celsius and having a quantity of water vapor.

In some embodiments, the quantity of water vapor in the gas is in a range of 0.1 to 20%.

In some embodiments, the forming of the SCR catalyst includes performing an ion-exchange process, and wherein the heating of the raw materials is performed one of before, during or after the ion-exchange process.

In some embodiments, an aftertreatment system for treating constituents of an exhaust gas generated by an engine, comprises: a selective catalytic reduction (SCR) system including a SCR catalyst; an oxidation catalyst disposed upstream of the SCR catalyst; and a controller configured to: determine an amount of $SO_x$ gases in the exhaust gas flowing through the aftertreatment system, and in response to the concentration of the $SO_x$ gases being above a threshold, cause heating of the SCR catalyst to an aging temperature in the presence of water to hydrothermally age the SCR catalyst.

In some embodiments, the aftertreatment system further comprises a heater operatively coupled to the SCR system. In such embodiments, the controller is configured to selectively activate the heater to heat the SCR catalyst to the aging temperature.

In some embodiments, the aftertreatment system further comprises a hydrocarbon insertion assembly configured to insert hydrocarbons into an exhaust gas flow path of the exhaust gas flowing through the aftertreatment system upstream of the oxidation catalyst. In such embodiments, the controller is configured to command the hydrocarbon insertion assembly to insert hydrocarbons into the exhaust gas flow path, the hydrocarbons combusting over the oxidation catalyst to heat the SCR catalyst to the aging temperature.

In some embodiments, the controller is further configured to determine a $NO_x$ conversion efficiency of the SCR catalyst based on a concentration of $NO_x$ gases upstream of the SCR system; and in response to the $NO_x$ conversion efficiency of the SCR catalyst being less than an efficiency threshold, heat the SCR system to a regeneration temperature for regenerating the SCR catalyst.

In some embodiments, the controller is configured to perform the hydrothermal aging of the SCR catalyst after regenerating the SCR catalyst.

In some embodiments, the SCR catalyst comprises a metal-zeolite catalyst.

In some embodiments, the aging temperature is about 650 degrees Celsius.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

BRIEF DESCRIPTION OF THE DRAWINGS

The foregoing and other features of the present disclosure will become more fully apparent from the following description and appended claims taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

Figure 1:
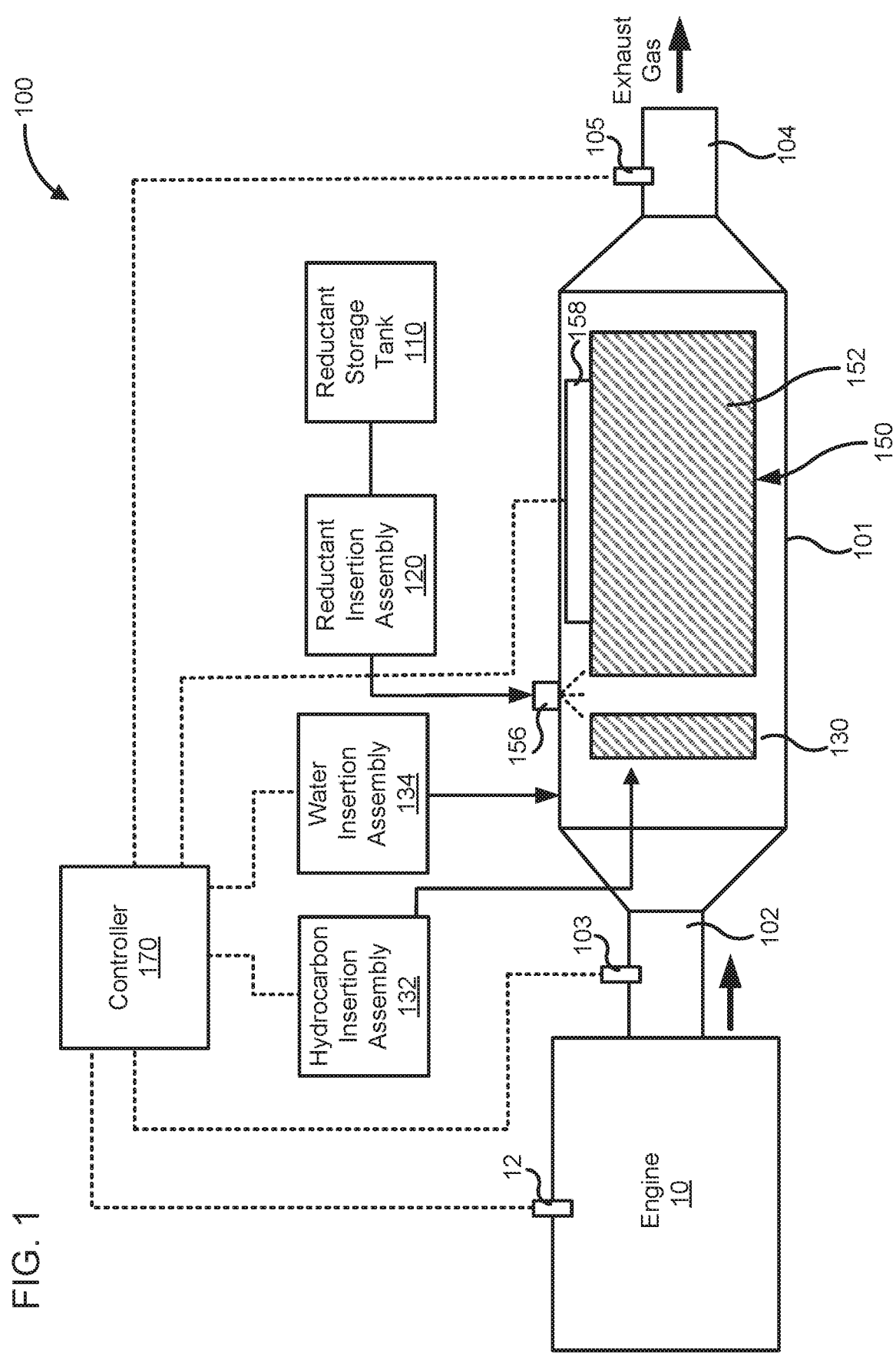
FIG. 1 is a schematic illustration of an aftertreatment system, according to an embodiment.

Reference is made to the accompanying drawings throughout the following detailed description. In the drawings, similar symbols typically identify similar components unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein and illustrated in the figures, can be arranged, substituted, combined, and designed in a wide variety of different configurations, all of which are explicitly contemplated and made part of this disclosure.

DETAILED DESCRIPTION

Embodiments described herein relate generally to SCR catalysts that have been aged or hydrothermally aged to increase their sulfur resistance, and in particular, to methods for aging of the SCR catalyst during the manufacturing process of the SCR catalyst, or after the SCR catalyst has been formed into a SCR system.

$SO_x$ gases are a common cause of degradation of $NO_x$ conversion efficiency of SCR catalysts leading to deactivation of the SCR catalyst. Copper-zeolite catalysts (e.g., Cu-exchanged CHA zeolite catalysts) used for $NO_x$ reduction in exhaust gas such as diesel exhaust gases are particularly susceptible to deactivation due to presence of $SO_x$ gases in the exhaust gas. For example, a concentration of $SO_x$ gases of greater than 1 ppm in the exhaust gas can lead to rapid sulfation of SCR catalysts. Presence of $SO_x$ gases in the exhaust gas can bind to the copper-zeolite SCR catalyst and leads to reduction in $NO_x$ conversion efficiency of the SCR catalyst. SCR catalysts are generally de-sulfated by heating to a high temperature (e.g., 500 degrees Celsius or higher) to remove sulfur from the SCR catalyst to recover performance of the SCR catalyst.

In contrast, various embodiments of the systems and methods described herein for enhancing sulfur resistance of a SCR catalyst may provide one or more benefits including, for example: (1) increasing sulfur resistance of an SCR catalyst by aging or hydrothermally aging the SCR catalyst before being installed in an aftertreatment system; (2) allowing flexibility of aging during the manufacturing process of the SCR catalyst or after manufacturing thereof; (3) allowing selective aging of the SCR catalyst during operation; and (4) reducing regeneration frequency of the SCR catalyst, thereby reducing fuel consumption, and reducing maintenance costs.

FIG. 1 is a schematic illustration of an aftertreatment system 100, according to an embodiment. The aftertreatment system 100 is configured to receive an exhaust gas from an engine 10 (e.g., a diesel engine, a gasoline engine, a natural gas engine, a dual fuel engine, a biodiesel engine, an E-85 engine, or any other suitable engine) and reduce constituents of the exhaust gas such as, for example, $NO_x$ gases, CO, hydrocarbons, etc. In some embodiments, the fuel consumed by the engine 10 may include a fuel having a high sulfur concentration, for example, greater than 15 ppm. (e.g., a high sulfur concentration diesel fuel). The aftertreatment system 100 may comprise a reductant storage tank 110, a reductant insertion assembly 120, a housing 101, a SCR system 150 comprising a SCR catalyst 152, and a controller 170. In some embodiments, the aftertreatment system 100 may also include an oxidation catalyst 130 (e.g., a diesel oxidation catalyst), a hydrocarbon insertion assembly 132, and a water insertion assembly 134.

The housing 101 defines an internal volume within which the oxidation catalyst 130 and the SCR system 150 are disposed. The housing 101 may be formed from a rigid, heat-resistant and corrosion-resistant material, for example stainless steel, iron, aluminum, metals, ceramics, or any other suitable material. The housing 101 may have any suitable cross-section, for example circular, square, rectangular, oval, elliptical, polygonal, or any other suitable shape.

An inlet conduit 102 is fluidly coupled to an inlet of the housing 101 and structured to receive exhaust gas from the engine 10 and communicate the exhaust gas to an internal volume defined by the housing 101. Furthermore, an outlet conduit 104 may be coupled to an outlet of the housing 101 and structured to expel treated exhaust gas into the environment (e.g., treated to reduce constituents of the exhaust gas such as $NO_x$ gases, unburnt hydrocarbons, etc. included in the exhaust gas).

A first sensor 103 may be positioned in the inlet conduit 102. The first sensor 103 may comprise a $NO_x$ sensor configured to measure an amount of $NO_x$ gases included in the exhaust gas flowing into the SCR system 150 and may include a physical sensor or a virtual sensor. In other embodiments, the first sensor 103 may include a $SO_x$ sensor configured to determine an amount of $SO_x$ gases in the exhaust gas flowing through the aftertreatment system 100.

In various embodiments, a temperature sensor, a pressure sensor, an oxygen sensor or any other sensor may also be positioned in the inlet conduit 102 so as to determine one or more operational parameters of the exhaust gas flowing through the aftertreatment system 100.

A second sensor 105 may be positioned in the outlet conduit 104. The second sensor 105 may comprise a second NOx sensor configured to determine an amount of NOx gases expelled into the environment after passing through the SCR system 150. In other embodiments, the second sensor 105 may comprise a particulate matter sensor configured to determine an amount of particulate matter (e.g., soot included in the exhaust gas exiting a filter) in the exhaust gas being expelled into the environment. In still other embodiments, the second sensor 105 may comprise an ammonia sensor configured to measure an amount of ammonia in the exhaust gas flowing out of the SCR system 150, i.e., determine the ammonia slip. This may be used as a measure of determining a catalytic efficiency of the SCR catalyst 152 included in the SCR system 150, adjusting an amount of reductant to be inserted into the SCR system 150, and/or adjusting a temperature of the SCR system 150 so as to allow the SCR system 150 to effectively use the ammonia for catalytic decomposition of the $NO_x$ gases included in the exhaust gas flowing therethrough. An ammonia oxidation ($AMO_x$) catalyst may be positioned downstream of the SCR system 150 to decompose any unreacted ammonia in the exhaust gas downstream of the SCR system 150.

In some embodiments, a sulfur sensor 12 may be coupled to the engine 10, for example, the fuel tank of the engine 10 or a fuel insertion assembly of the engine 10. The sulfur sensor 12 is configured to determine an amount of sulfur in the fuel and may include a physical sensor or a virtual sensor. The fuel may be determined to have a high sulfur content in response to a concentration of sulfur in the fuel being greater than 15 ppm.

An oxidation catalyst 130 may be positioned upstream of the SCR system 150 and configured to decompose unburnt hydrocarbons and/or CO included in the exhaust gas. In particular embodiments, the oxidation catalyst 130 comprises a diesel oxidation catalyst. In some embodiments, the aftertreatment system 100 may also include a filter (e.g., a diesel particulate filter), for example, disposed between the oxidation catalyst 130 and the SCR system 150, and configured to remove particulate matter (e.g., soot, debris, inorganic particles, etc.) from the exhaust gas. In various embodiments, the filter may include a ceramic filter. In some embodiments, the filter may include a cordierite filter that can, for example, be an asymmetric filter. In yet other embodiments, the filter may be catalyzed.

In some embodiments, a hydrocarbon insertion assembly 132 may be coupled to the housing 101 and configured to selectively insert hydrocarbons onto the oxidation catalyst 130. The oxidation catalyst 130 is formulated to catalyze ignition of the hydrocarbons so as to increase a temperature of the exhaust gas, for example, to regenerate the SCR catalyst 152 and/or a filter disposed downstream of the oxidation catalyst 130. In various embodiments, the hydrocarbon insertion assembly 132 may include pumps, injectors, nozzles, valves, filters, or any other suitable components for inserting hydrocarbons into the exhaust gas or onto the oxidation catalyst 130. The hydrocarbon insertion assembly may be configured to draw fuel (diesel) from a fuel tank associated with the engine 10 for selection insertion into the exhaust gas.

In some embodiments, a water insertion assembly 134 may also be fluidly coupled to the housing 101 and configured to insert water (e.g., a water jet, a water spray, or water vapor) into the housing 101. In some embodiments, the water insertion assembly 134 may include a water tank for storing water (e.g., deionized water or sterilized water), a water pump, nozzles, filters or any other suitable components for facilitating insertion of a water jet, a water spray, or water vapor into the exhaust gas flowing through the aftertreatment system 100. While the water insertion assembly 134 is shown in FIG. 1 as being fluidly coupled to the housing 101 upstream of the oxidation catalyst 130, in other embodiments, the water insertion assembly 134 may be fluidly coupled to the housing 101 downstream of the oxidation catalyst 130 and upstream of the SCR catalyst 152.

The SCR catalyst 152 included in the SCR system 150 is formulated to decompose constituents of an exhaust gas flowing therethrough in the presence of a reductant. In some embodiments, the SCR system 150 may include a selective catalytic reduction filter (SCRF). The SCR catalyst 152 may include a metal-zeolite catalyst including, but not limited to Cu-CHA-Zeolite (e.g., a Cu-SSZ-13 catalyst), but also other zeolite structures including Cu-SAPO-34 catalyst, Cu-LTA, Cu-AEI, Cu-ZSM, Cu-beta, Cu-Chabazite, or any other suitable catalyst. In other embodiments, the SCR catalyst 152 may include an iron-zeolite or a copper/iron-zeolite catalyst. In still other embodiments, the SCR catalyst may include a multi-zone catalyst, for example, having a first zone including a copper-zeolite catalyst, and a second zone including an iron-zeolite catalyst, or vice versa. The SCR catalyst 152 may be disposed on a suitable substrate such as, for example, a ceramic (e.g., cordierite) or metallic (e.g., kanthal) monolith core which can, for example, define a honeycomb structure. A washcoat can also be used as a carrier material for the SCR catalyst 152. Such washcoat materials may comprise, for example, aluminum oxide, titanium dioxide, silicon dioxide, any other suitable washcoat material, or a combination thereof. The monolith core may be securely positioned in a can to form the SCR system 150 that is installed in the aftertreatment system 100. In some embodiments, a heater 158 may be coupled to the SCR system 150 and configured to heat the SCR system 150, for example, to a regeneration or hydrothermal aging temperature of the catalyst.

Although FIG. 1 shows only the oxidation catalyst 130 and the SCR system 150 positioned within the internal volume defined by the housing 101, in other embodiments, a plurality of aftertreatment components may be positioned within the internal volume defined by the housing 101 in addition to the oxidation catalyst 130 and the SCR system 150. Such aftertreatment components may comprise, for example, mixers, baffle plates, secondary filters (e.g., a secondary partial flow or catalyzed filter) or any other suitable aftertreatment component.

A reductant port 156 may be positioned on a sidewall of the housing 101 and structured to allow insertion of a reductant therethrough into the internal volume defined by the housing 101. The reductant port 156 may be positioned upstream of the SCR system 150 (e.g., to allow reductant to be inserted into the exhaust gas upstream of the SCR system 150) or over the SCR system 150 (e.g., to allow reductant to be inserted directly on the SCR system 150). In other embodiments, the reductant port 156 may be disposed on the inlet conduit 102 and configured to insert the reductant into the inlet conduit 102 upstream of the SCR system 150. In such embodiments, mixers, baffles, vanes or other structures may be positioned in the inlet conduit 102 so as to facilitate mixing of the reductant with the exhaust gas.

The reductant storage tank 110 is structured to store a reductant. The reductant is formulated to facilitate decomposition of the constituents of the exhaust gas (e.g., NOx gases included in the exhaust gas). Any suitable reductant can be used. In some embodiments, the exhaust gas comprises a diesel exhaust gas and the reductant comprises a diesel exhaust fluid. For example, the diesel exhaust fluid may comprise urea, an aqueous solution of urea, or any other fluid that comprises ammonia, by-products, or any other diesel exhaust fluid as is known in the arts (e.g., the diesel exhaust fluid marketed under the name ADBLUE®). For example, the reductant may comprise an aqueous urea solution having a particular ratio of urea to water. In particular embodiments, the reductant can comprise an aqueous urea solution including 32.5% by volume of urea and 67.5% by volume of deionized water, including 40% by volume of urea and 60% by volume of deionized water, or any other suitable ratio of urea to deionized water.

A reductant insertion assembly 120 is fluidly coupled to the reductant storage tank 110. The reductant insertion assembly 120 is configured to selectively insert the reductant into the SCR system 150 or upstream thereof (e.g., into the inlet conduit 102) or a mixer (not shown) positioned upstream of the SCR system 150. The reductant insertion assembly 120 may comprise various structures to facilitate receipt of the reductant from the reductant storage tank 110 and delivery to the SCR system 150, for example, pumps, valves, screens, filters, etc.

The aftertreatment system 100 may also comprise a reductant injector fluidly coupled to the reductant insertion assembly 120 and configured to insert the reductant (e.g., a combined flow of reductant and compressed air) into the SCR system 150. In various embodiments, the reductant injector may comprise a nozzle having predetermined diameter. In various embodiments, the reductant injector may be positioned in the reductant port 156 and structured to deliver a stream or a jet of the reductant into the internal volume of the housing 101 so as to deliver the reductant to the SCR system 150.

The SCR catalyst 152 included in the SCR system 150 is aged, for example, hydrothermally aged (i.e., aged in the presence of water vapor) such that the SCR catalyst 152 has high resistance to sulfur. Particularly, the SCR catalyst 152 is hydrothermally aged by heating the SCR catalyst 152 to a temperature of greater than 500 degrees Celsius for a predetermined time in the presence of water before being installed in the aftertreatment system 100. In some embodiments, the temperature may be in a range of 510 to 700 degrees Celsius (e.g., 510, 520, 530, 540, 550, 560, 570, 580, 590, 600, 610, 620, 630, 640, 650, 660, 670, 680, 690 or 700 degrees Celsius, inclusive of all ranges and values therebetween). In particular embodiments, the temperature may be about 650 degrees Celsius. In some embodiments, the SCR catalyst 152 is hydrothermally aged by flowing a gas (e.g., air or exhaust gas) including water vapor in a range of 0.1% to 20% therein over the SCR catalyst 152 or through the SCR system 150 including the SCR catalyst 152. The predetermined time may be in a range of 1 hours to 1,000 hours (e.g., 10, 20, 30, 40, 50, 60, 70, 80, 90, 100, 200, 300, 400, 500, 600, 700, 800, 900, or 1,000 hours, inclusive of all ranges and values therebetween).

In some embodiments, the aging or hydrothermal aging may be performed after the SCR catalyst 152 is formed into the SCR system 150. For example, once the SCR system 150 is formed, gas (e.g., air or exhaust gas) heated to a temperature of greater than 500 degrees Celsius and including 0.1-20% water vapor is flowed through the SCR system 150 for 1-1,000 hours to hydrothermally age the SCR catalyst 152. The SCR catalyst 152 may be disposed inside or outside of a can included in the SCR system 150 when the hydrothermal aging is performed.

In other embodiments, the aging may be performed during the manufacturing of the SCR catalyst 152 from its constituent raw materials. For example, in some embodiments, raw materials used to form the SCR catalyst, for example, raw materials used to form zeolite, are heated to the temperature of greater than 500 degrees Celsius (e.g., 510, 520, 530, 540, 550, 560, 570, 580, 590, 600, 610, 620, 630, 640, 650, 660, 670, 680, 690 or 700 degrees Celsius, inclusive of all ranges and values therebetween) in the presence of 0.1-20% water vapor or under anhydrous conditions. In particular embodiments, the SCR catalyst 152 is a copper-zeolite catalyst and the raw materials may include copper salts and a zeolite matrix (e.g., ammonium/SSZ-13). The SCR catalyst 152 is then formed from the raw materials, for example, via an ion-exchange process (e.g., solution on exchange process). The zeolite may then be prepared.

The SCR catalyst 152 may also include ion-exchange of a metal ion (e.g., Cu, Fe or Cu/Fe) to form ion-exchange catalyst, i.e., aging or hydrothermal aging is performed after the SCR catalyst 152 has been formed from the raw materials. In various embodiments, the hydrothermal aging may be performed before, during and/or after an ion-exchange process used to form the SCR catalyst 152. The ion-exchanged catalyst may be in powder form and the catalyst powder may be mixed with additives or solvents to form a slurry. In some embodiments, the aging or hydrothermal aging may be performed before or after the slurry formation process.

The SCR catalyst 152 formation process may also include applying the slurry onto an inert matrix (e.g., a honeycomb substrate) in a washcoating process to form a monolithic structure. In some embodiments, the aging or hydrothermal aging is performed during or after the washcoating process. In some embodiments, only a portion of the aged SCR catalyst slurry may be washcoated on the inert matrix. For example, the aged SCR catalyst slurry may only be coated on a first portion (e.g., an upstream portion) of the monolith, and a non-aged SCR catalyst slurry (e.g., a metal-zeolite or any other suitable non-aged catalyst slurry) is coated on the remaining portion (e.g., a downstream portion) of the matrix to form the monolith.

The SCR catalyst 152 may then be calcined, i.e., exposed to a temperature of greater than 600 degrees Celsius (e.g., up to 800 degrees Celsius) to calcify the SCR catalyst 152. For example, the washcoated monoliths may be disposed in a furnace or oven to calcine the SCR catalyst 152. In some embodiments, aging or hydrothermal aging may be performed after calcining. In other embodiments, the calcining process may be adapted to perform hydrothermal aging during the calcining process. The SCR catalyst 152 is then formed into the SCR system 150, for example, the SCR catalyst 152 is inserted into a can to form the SCR system 150. In some embodiments, the SCR catalyst 152 may be aged or hydrothermally aged after being canned.

Figure 3:
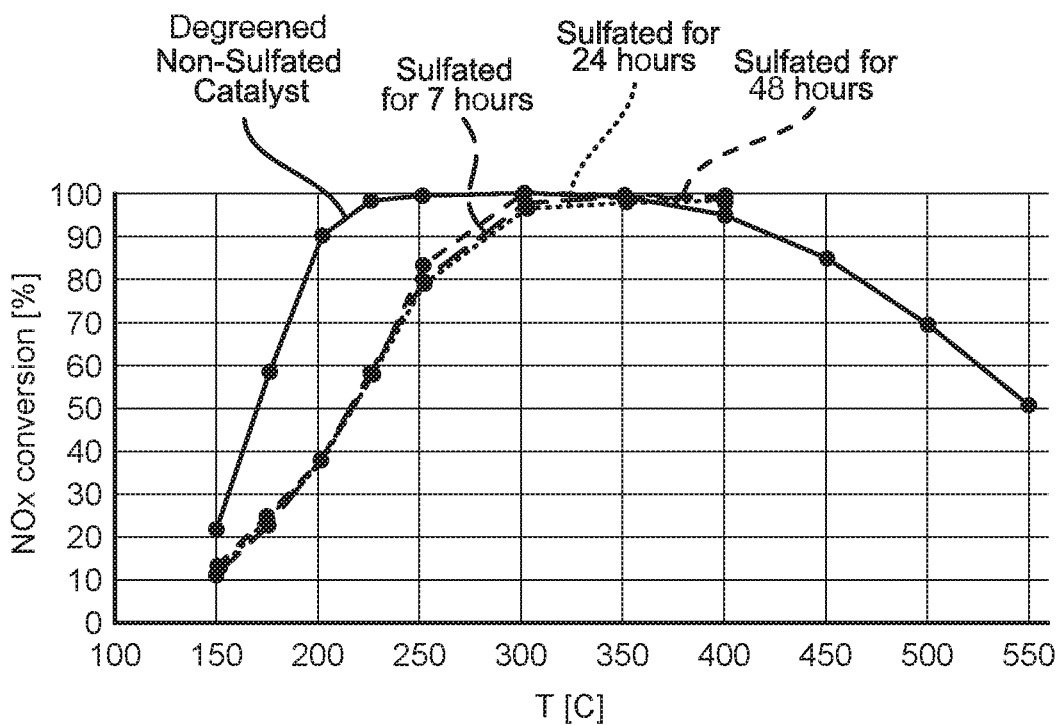
FIG. 3 shows plots of NOx conversion efficiency of a degreened SCR catalyst at various temperatures before being exposed to $SO_x$ gases, and after being exposed to an exhaust gas including $SO_x$ gases for a period of 7 hours, 24 hours and 48 hours.

The hydrothermal aging increases the sulfur resistance of the SCR system 150. For example, FIG. 3 shows plots of $NO_x$ conversion efficiency of a degreened SCR catalyst at various temperatures before being exposed to $SO_x$ gases, and after being exposed to an exhaust gas including $SO_x$ gases for a period of 7 hours, 24 hours and 48 hours. The SCR catalyst was degreened by heating to a low hydrothermal temperature in the range of 450-550 degrees Celsius for a period of 4-24 hours to stabilize the de-$NO_x$ performance of the SCR catalyst. The SCR catalyst includes a Cu-SSZ-13 catalyst. Sulfation was performed at 400 degrees Celsius by flowing simulated exhaust gas having 500 ppm NO at an ammonia-to-NOx ratio (ANR) of 1.0, and 20 ppm SOx gases (about 9 ppm $SO_3$), through the SCR catalyst. The 400 degrees Celsius temperature was chosen for sulfation because $NO_x$ conversion efficiency of the SCR catalyst reaches steady state at 400 degrees Celsius but demonstrates continuous decrease in $NO_x$ conversion efficiency with time upon exposure to $SO_x$ gases at temperatures below 350 degrees Celsius. The saturation of the $NO_x$ conversion efficiency of the SCR catalyst at 400 degrees Celsius can be attributed to the absence of bisulfate formation. Hence, 400 degrees Celsius was selected to rule out the effect of physical adsorption or masking of sulfur species. $NO_x$ conversion efficiency was determined using exhaust gas at a temperature of 400 degrees Celsius and having 500 ppm NO at a ANR of 1.0. It should be appreciated that while the plots of FIGS. 3-5 are described with respect to a degreened SCR catalyst, the concepts described herein are equally applicable to a non-degreened SCR catalyst.

As seen in FIG. 3, $NO_x$ conversion efficiency of the sulfated SCR catalyst decreases relative to the non-sulfated degreened SCR catalyst, at temperatures between 200 and 300 degrees Celsius but is about the same at 400 degrees Celsius, which corresponds to a regular operating temperature of the exhaust gas. However, the temperature of the exhaust gas may be lower than 300 degrees Celsius (e.g., in a range of 200-300 degrees Celsius), for example, at engine 10 startup or low load operation, which can result in a higher amount of $NO_x$ to be released in the atmosphere due to lower $NO_x$ conversion efficiency of the sulfated SCR catalyst at such low temperatures.

Figure 4:
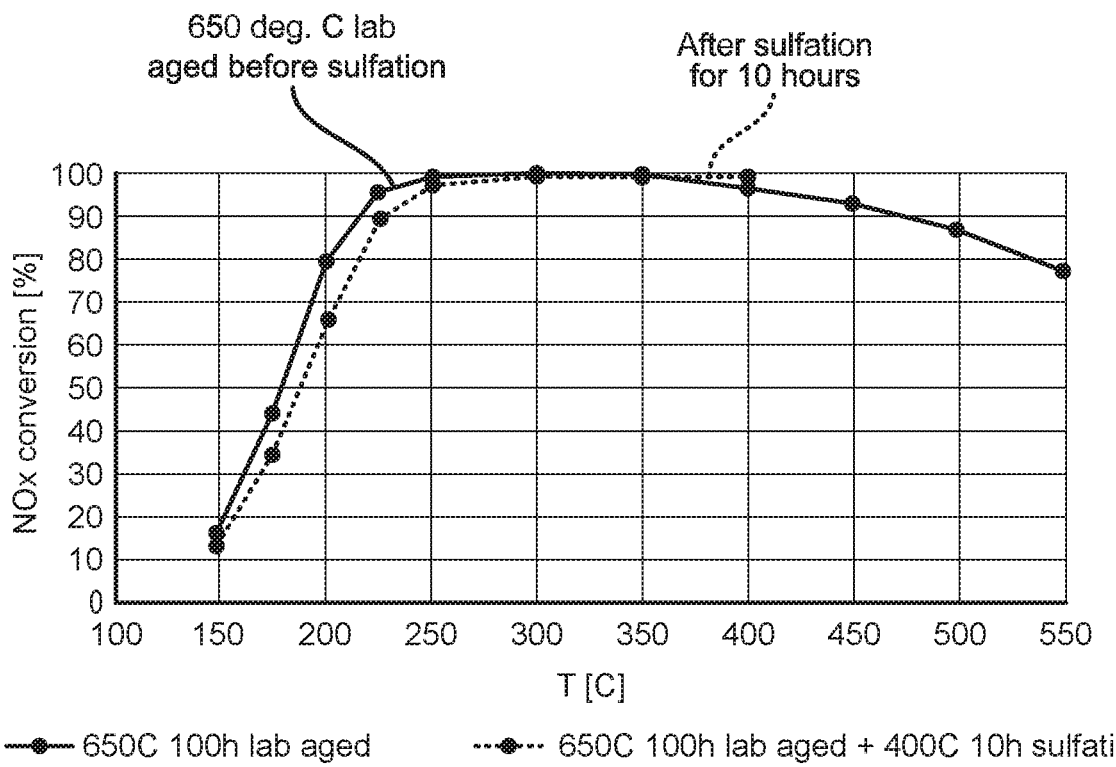
FIG. 4 shows plots of NOx conversion efficiency of a hydrothermally aged catalyst, aged at a temperature of 650 degrees Celsius by flowing a gas having 10% water through the SCR catalyst, before being exposed to $SO_x$ gases and after being exposed to $SO_x$ gases for a period of 10 hours at 400 degrees Celsius.

FIG. 4 shows plots of $NO_x$ conversion efficiency of a hydrothermally aged catalyst, aged at a temperature of 650 degrees Celsius by flowing a gas having 10% water vapor through the SCR catalyst, before being exposed to $SO_x$ gases and after being exposed to SOx gases for a period of 10 hours at 400 degrees Celsius. The hydrothermally aged SCR catalyst experiences a much smaller decrease in NOx conversion efficiency in the temperature range of 200-300 degrees Celsius, therefore demonstrating a higher resistance to sulfur.

Figure 5:
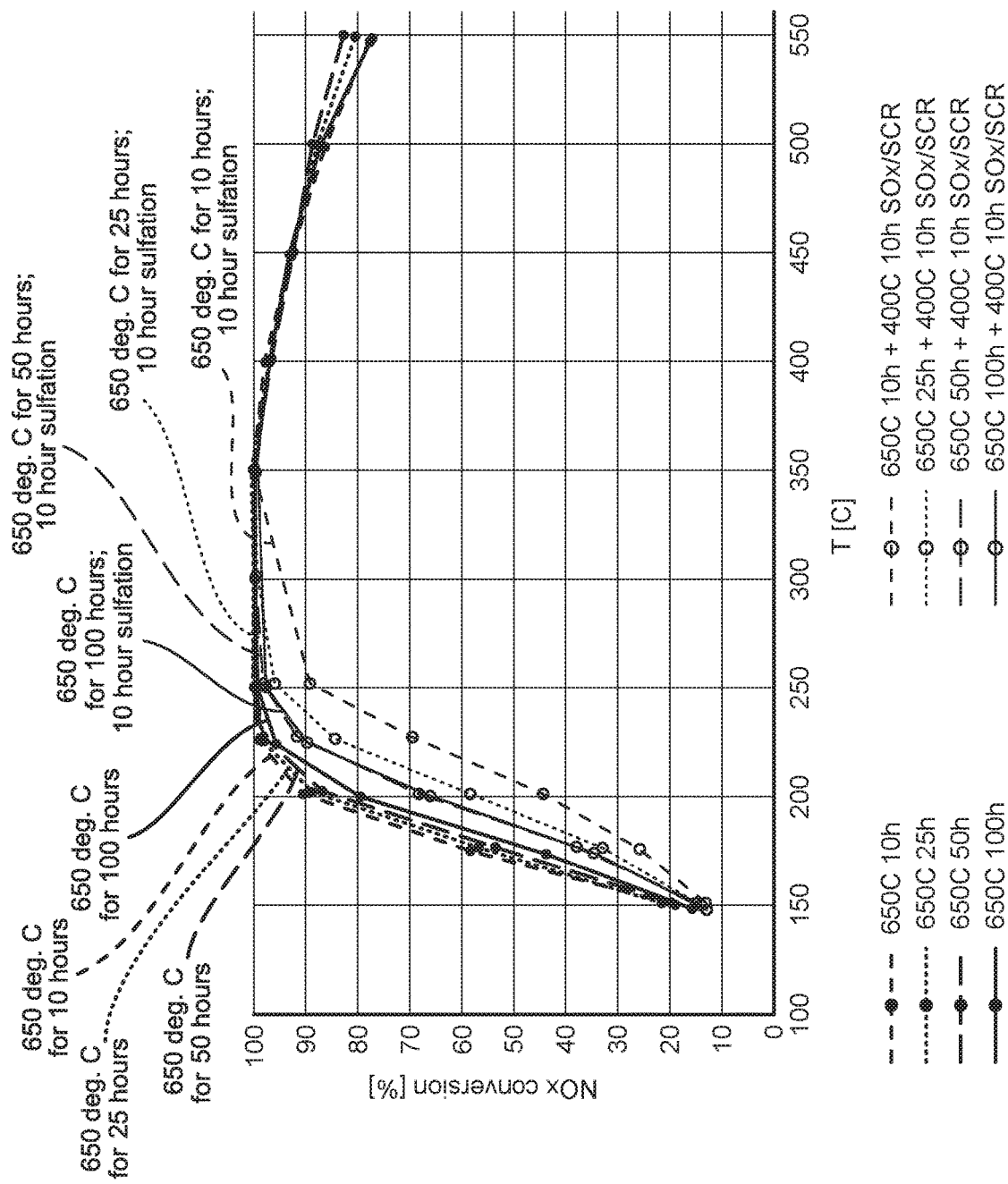
FIG. 5 shows NOx conversion efficiency of SCR catalysts hydrothermally aged at a temperature of 650 degrees Celsius for a period of 10 hours, 25 hours, 50 hours and 100 hours, after being exposed to $SO_x$ gases for 10 hours at 400 degrees Celsius.

FIG. 5 shows NOx conversion efficiency of SCR catalysts hydrothermally aged at a temperature of 650 degrees Celsius for a period of 10 hours, 25 hours, 50 hours and 100 hours, after being exposed to $SO_x$ gases for 10 hours at 400 degrees Celsius. The SCR catalysts demonstrate increasing $NO_x$ conversion efficiency post-sulfation as the aging time is increased from 10 hours to 50 hours, and a much smaller improvement is observed on increasing the aging time to 100 hours.

Referring again to FIG. 1, the controller 170 may be communicatively coupled to the first sensor 103 and may be configured to receive a first sensor signal from the first sensor 103, for example, to determine an amount of $NO_x$ gases included in the exhaust gas entering the aftertreatment system 100. The controller 170 may also be communicatively coupled to the second sensor 105 and may be configured to determine a concentration of $NO_x$ gases or ammonia included in the exhaust gas being expelled into the environment. Furthermore, the controller 170 may be communicatively coupled to the sulfur sensor 12 and configured to determine a concentration of sulfur in the fuel provided to the engine 10. The controller 170 may be operably coupled to the various components of the aftertreatment system 100 using any type and any number of wired or wireless connections. For example, a wired connection may include a serial cable, a fiber optic cable, a CAT5 cable, or any other form of wired connection. Wireless connections may include the Internet, Wi-Fi, cellular, radio, Bluetooth, ZigBee, etc. In one embodiment, a controller area network (CAN) bus provides the exchange of signals, information, and/or data. The CAN bus includes any number of wired and wireless connections.

In some embodiments, the controller 170 may be configured to determine a $NO_x$ conversion efficiency of the SCR catalyst 152, for example, based on the concentration of $NO_x$ gases upstream of the SCR system 150 determined by the first sensor 103, and concentration of $NO_x$ gases downstream of the SCR system 150 determined by the second sensor 105. If the $NO_x$ conversion efficiency of the SCR catalyst 152 is below an efficiency threshold, the controller 170 may activate the heater 158 to heat the SCR system 150 to a regeneration temperature (e.g., about 600 degrees Celsius), or command the hydrocarbon insertion assembly 132 to insert hydrocarbons into the oxidation catalyst 130 causing the hydrocarbons to combust and increase a temperature of the exhaust gas to the regeneration temperature.

The controller 170 may also be configured to determine an amount of $SO_x$ gases in the exhaust gas flowing through the exhaust gas, for example, based on a $SO_x$ signal received from the first sensor 103, or from an amount of sulfur present in the fuel consumed by the engine 10 as determined by the sulfur sensor 12 (e.g., a physical or a virtual sensor). In response to the concentration of $SO_x$ gases in the exhaust gas being above a threshold (e.g., 1 ppm), the controller 170 may be configured to cause heating of the SCR system 150 to the aging or hydrothermal aging temperature (e.g., greater than 500 degrees Celsius) to de-sulfate the SCR catalyst 152. For example, the controller 170 may command the hydrocarbon insertion assembly 132 to insert hydrocarbons into the exhaust gas, the hydrocarbons combusting to produce heat for hydrothermal aging, or activate the heater 158 so as to heat the SCR catalyst 152. In other embodiments, the water insertion assembly 134 may be used to insert water into the exhaust gas for performing hydrothermal aging while the SCR catalyst 152 is being heated. This aging or hydrothermal aging is subsequent to the aging or hydrothermal aging of the SCR catalyst 152 before the SCR system 150 is installed into the aftertreatment system 100. The hydrothermal aging may be performed after each regeneration process for short periods of time (e.g., in a range of about 5 minutes to 10 minutes) or for a longer time (e.g., about 1 hour to 2 hours) after a predetermined number of regeneration event have occurred. In still other embodiments, the aftertreatment system 100 may not include a sulfur sensor. In such embodiments, the controller 170 is configured to perform de-sulfation and aging or hydrothermal aging in response to the $NO_x$ conversion efficiency dropping below the efficiency threshold.

Figure 2:
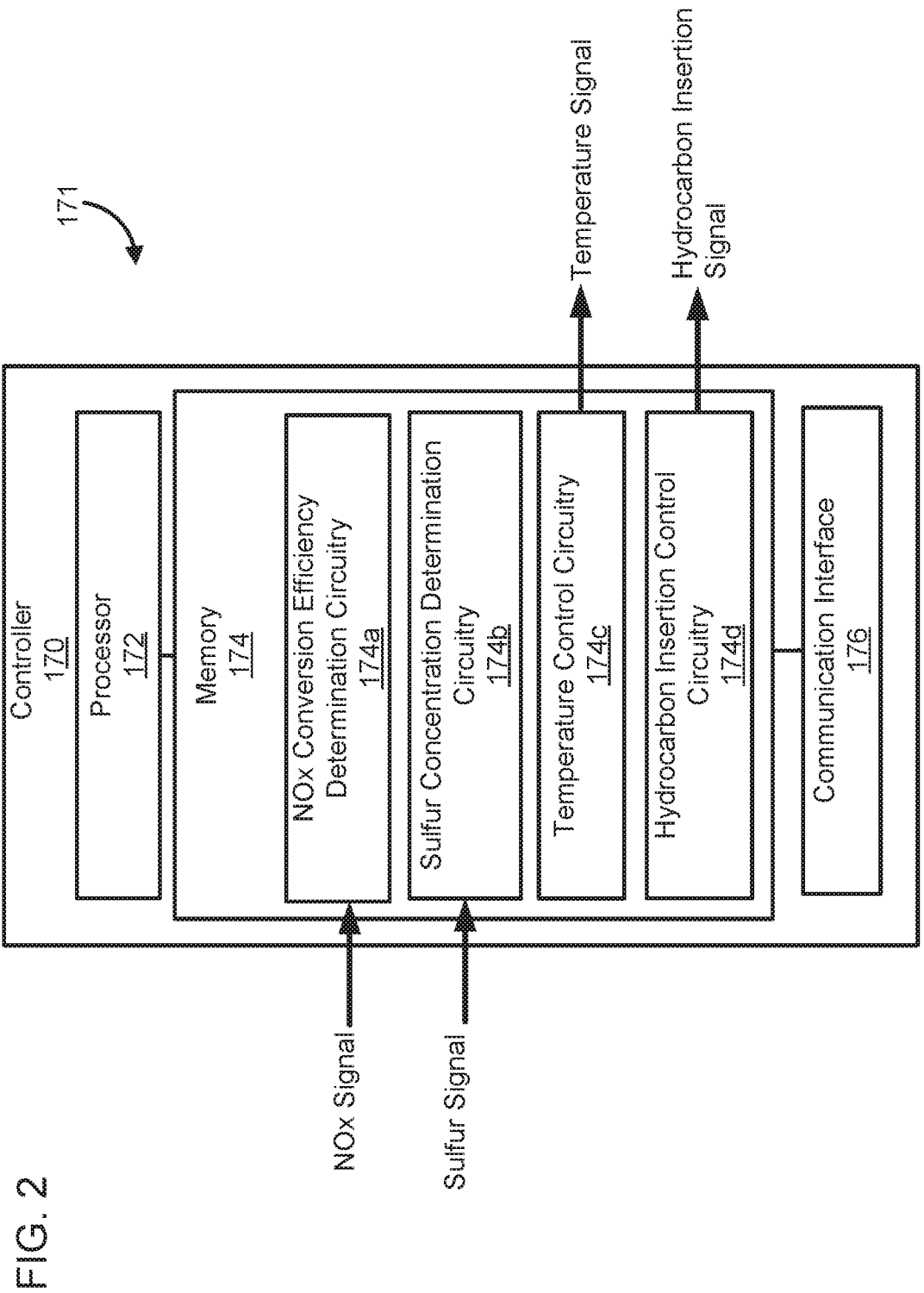
FIG. 2 is a schematic block diagram of a control module that may be used as a controller of the aftertreatment system of FIG. 1, according to an embodiment.

In particular embodiments, the controller 170 may be included in a control module. For example, FIG. 2 is a schematic block diagram of a control module 171 including the controller 170, according to an embodiment. The controller 170 comprises a processor 172, a memory 174, or any other computer readable medium, and a communication interface 176. Furthermore, the controller 170 includes a $NO_x$ conversion efficiency determination circuitry 174a, a sulfur concentration determination circuitry 174b, a temperature control circuitry 174c and a hydrocarbon insertion control circuitry 174d. It should be understood that the controller 170 shows only one embodiment of the controller 170 and any other controller capable of performing the operations described herein can be used.

The processor 172 can comprise a microprocessor, programmable logic controller (PLC) chip, an ASIC chip, or any other suitable processor. The processor 172 is in communication with the memory 174 and configured to execute instructions, algorithms, commands, or otherwise programs stored in the memory 174.

The memory 174 comprises any of the memory and/or storage components discussed herein. For example, memory 174 may comprise a RAM and/or cache of processor 172. The memory 174 may also comprise one or more storage devices (e.g., hard drives, flash drives, computer readable media, etc.) either local or remote to controller 170. The memory 174 is configured to store look up tables, algorithms, or instructions.

In one configuration, the $NO_x$ conversion efficiency determination circuitry 174a, the sulfur concentration determination circuitry 174b, the temperature control circuitry 174c and the hydrocarbon insertion control circuitry 174d are embodied as machine or computer-readable media (e.g., stored in the memory 174) that is executable by a processor, such as the processor 172. As described herein and amongst other uses, the machine-readable media (e.g., the memory 174) facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). Thus, the computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the $NO_x$ conversion efficiency determination circuitry 174a, the sulfur concentration determination circuitry 174b, the temperature control circuitry 174c, and the hydrocarbon insertion control circuitry 174d are embodied as hardware units, such as electronic control units. As such, the $NO_x$ conversion efficiency determination circuitry 174a, the sulfur concentration determination circuitry 174b, the temperature control circuitry 174c, and the hydrocarbon insertion control circuitry 174d may be embodied as one or more circuitry components including, but not limited to, processing circuitry, network interfaces, peripheral devices, input devices, output devices, sensors, etc.

In some embodiments, the $NO_x$ conversion efficiency determination circuitry 174a, the sulfur concentration determination circuitry 174b, the temperature control circuitry 174c, and the hydrocarbon insertion control circuitry 174d may take the form of one or more analog circuits, electronic circuits (e.g., integrated circuits (IC), discrete circuits, system on a chip (SOCs) circuits, microcontrollers, etc.) telecommunication circuits, hybrid circuits, and any other type of "circuit." In this regard, the $NO_x$ conversion efficiency determination circuitry 174a, the sulfur concentration determination circuitry 174b, the temperature control circuitry 174c, and the hydrocarbon insertion control circuitry 174d may include any type of component for accomplishing or facilitating achievement of the operations described herein. For example, a circuit as described herein may include one or more transistors, logic gates (e.g., NAND, AND, NOR, OR, XOR, NOT, XNOR, etc.) resistors, multiplexers, registers, capacitors, inductors, diodes, wiring, and so on.

Thus, the $NO_x$ conversion efficiency determination circuitry 174a, the sulfur concentration determination circuitry 174b, the temperature control circuitry 174c, and the hydrocarbon insertion control circuitry 174d may also include programmable hardware devices such as field programmable gate arrays, programmable array logic, programmable logic devices or the like. In this regard, the $NO_x$ conversion efficiency determination circuitry 174a, the sulfur concentration determination circuitry 174b, the temperature control circuitry 174c, and the hydrocarbon insertion control circuitry 174d may include one or more memory devices for storing instructions or algorithms that are executable by the processor(s) of the $NO_x$ conversion efficiency determination circuitry 174a, the sulfur concentration determination circuitry 174b, the temperature control circuitry 174c, and the hydrocarbon insertion control circuitry 174d. The one or more memory devices and processor(s) may have the same definition as provided below with respect to the memory 174 and the processor 172.

In the example shown, the controller 170 includes the processor 172 and the memory 174. The processor 172 and the memory 174 may be structured or configured to execute or implement the instructions, commands, and/or control processes described herein with respect to the $NO_x$ conversion efficiency determination circuitry 174a, the sulfur concentration determination circuitry 174b, the temperature control circuitry 174c, and the hydrocarbon insertion control circuitry 174d. Thus, the depicted configuration represents the aforementioned arrangement where the $NO_x$ conversion efficiency determination circuitry 174a, the sulfur concentration determination circuitry 174b, the temperature control circuitry 174c, and the hydrocarbon insertion control circuitry 174d are embodied as machine or computer-readable media. However, as mentioned above, this illustration is not meant to be limiting as the present disclosure contemplates other embodiments such as the aforementioned embodiment where the $NO_x$ conversion efficiency determination circuitry 174a, the sulfur concentration determination circuitry 174b, the temperature control circuitry 174c, and the hydrocarbon insertion control circuitry 174d, or at least one circuit of the $NO_x$ conversion efficiency determination circuitry 174a, the sulfur concentration determination circuitry 174b, the temperature control circuitry 174c, and the hydrocarbon insertion control circuitry 174d are configured as a hardware unit. All such combinations and variations are intended to fall within the scope of the present disclosure.

The processor 172 may be implemented as one or more general-purpose processors, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the $NO_x$ conversion efficiency determination circuitry 174a, the sulfur concentration determination circuitry 174b, the temperature control circuitry 174c, and the hydrocarbon insertion control circuitry 174d) may comprise or otherwise share the same processor which, in some example embodiments, may execute instructions stored, or otherwise accessed, via different areas of memory. Alternatively, or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure. The memory 174 (e.g., RAM, ROM, Flash Memory, hard disk storage, etc.) may store data and/or computer code for facilitating the various processes described herein. The memory 174 may be communicably connected to the processor 172 to provide computer code or instructions to the processor 172 for executing at least some of the processes described herein. Moreover, the memory 174 may be or include tangible, non-transient volatile memory or non-volatile memory. Accordingly, the memory 174 may include database components, object code components, script components, or any other type of information structure for supporting the various activities and information structures described herein.

The communication interface 176 may include wireless interfaces (e.g., jacks, antennas, transmitters, receivers, communication interfaces, wire terminals, etc.) for conducting data communications with various systems, devices, or networks. For example, the communication interface 176 may include an Ethernet card and port for sending and receiving data via an Ethernet-based communications network and/or a Wi-Fi communication interface for communicating with the first sensor 103, the second sensor 105, the engine 10, the sulfur sensor 12, the heater 158 and/or the hydrocarbon insertion assembly 132. The communication interface 176 may be structured to communicate via local area networks or wide area networks (e.g., the Internet, etc.) and may use a variety of communications protocols (e.g., IP, LON, Bluetooth, ZigBee, radio, cellular, near field communication, etc.).

The $NO_x$ conversion efficiency determination circuitry 174a is configured to determine a $NO_x$ conversion efficiency of the SCR catalyst 152. For example, the $NO_x$ conversion efficiency determination circuitry 174a may receive a $NO_x$ signal from the first sensor 103 and the second sensor 105 and determine a $NO_x$ conversion efficiency of the SCR catalyst 152 therefrom.

The sulfur concentration determination circuitry 174b is configured to receive a sulfur concentration signal, for example, from the sulfur sensor 12 or the first sensor 103, and determine a concentration of sulfur in the fuel or the exhaust gas therefrom, respectively. The temperature control circuitry 174c is configured to generate a temperature signal which may be communicated to the heater 158 so as to increase a temperature of the SCR system 150 to the regeneration temperature or the hydrothermal aging temperature (e.g., in range of 510-700 degrees Celsius such as 650 degrees Celsius).

The hydrocarbon insertion control circuitry 174d is configured to generate a hydrocarbon insertion signal configured to cause the hydrocarbon insertion assembly 132 to selectively insert a predetermined amount of hydrocarbons into the oxidation catalyst 130 to increase a temperature of the exhaust gas (e.g., to the regeneration or hydrothermal aging temperature) and/or generate water vapor due to combustion of the hydrocarbons, so as to allow hydrothermal aging of the SCR catalyst 152. In other embodiments, alternatively, or additionally, the aftertreatment system 100 may include the water insertion assembly 134 for inserting water vapor into the exhaust gas to allow hydrothermal aging of the SCR catalyst 152.

Figure 6:
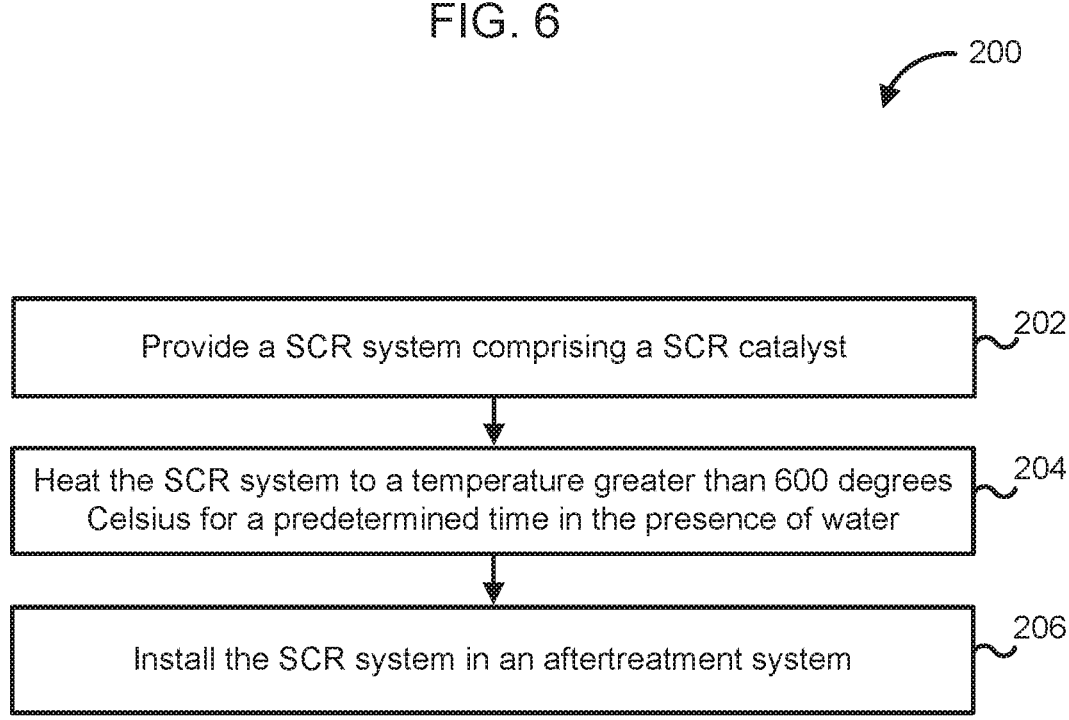
FIG. 6 is a schematic flow diagram of a method for aging a SCR system, according to an embodiment.

FIG. 6 is a schematic flow diagram of a method 200 for increasing sulfur resistance of a SCR catalyst (e.g., the SCR catalyst 152) included in a SCR system (e.g., the SCR system 150). The method 200 includes providing an SCR system including a SCR catalyst, at 202. For example, the SCR system may include the SCR system 150 including the SCR catalyst 152 (e.g., a copper-zeolite catalyst).

At 204, the SCR system is heated to a temperature greater than 500 degrees Celsius for a predetermined time and in some embodiments, in the presence of water vapor, so as to increase sulfur resistance of the SCR catalyst. For example, a feed gas (e.g., air or exhaust gas) including 0.1% to 20% (e.g., about 10%) water vapor may be flowed through the SCR system 150 at the temperature of greater than 500 degrees Celsius, for example, 510, 520, 530, 540, 550, 560, 570, 580, 590, 600, 610, 620, 630, 640, 650, 660, 670, 680, 690 or 700 degrees Celsius, inclusive of all ranges and values therebetween (e.g., about 650 degrees Celsius) for a period of 10, 20, 30, 40, 50, 60, 70, 80, 90, 100, 200, 300, 400, 500, 600, 700, 800, 900, or 1,000 hours, inclusive of all ranges and values therebetween (e.g., 50-100 hours). This hydrothermally ages the SCR catalyst 152 and increases sulfur resistance thereof, as previously described herein. The SCR system 150 including the aged or hydrothermally aged SCR catalyst 152 is then installed in an aftertreatment system (e.g., the aftertreatment system 100), at 206.

Figure 7:
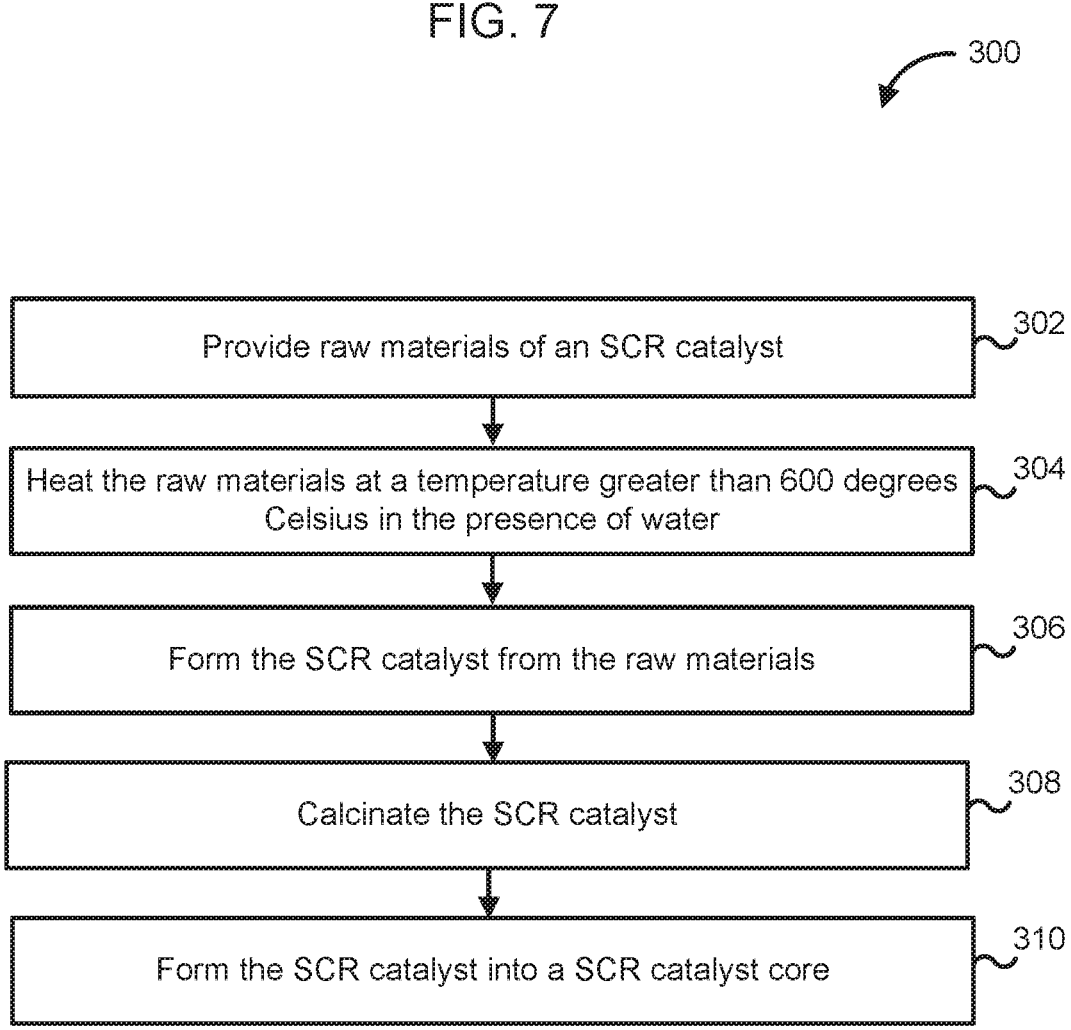
FIG. 7 is a schematic flow diagram of a method for aging a catalyst during a manufacturing process thereof, according to an embodiment.

FIG. 7 is a schematic flow diagram of a method 300 for increasing sulfur resistance of a SCR catalyst (e.g., the SCR catalyst 152) during a manufacturing process thereof, according to an embodiment. The method 300 includes providing raw materials of the SCR catalyst, at 302. For example, the SCR catalyst 152 may be a copper-zeolite catalyst and the raw materials may include copper salts and a zeolite matrix (e.g., ammonium/SSZ-13). In some embodiments, the method 300 includes heating the raw materials to a temperature of greater than 500 degrees Celsius, for example, 510, 520, 530, 540, 550, 560, 570, 580, 590, 600, 610, 620, 630, 640, 650, 660, 670, 680, 690 or 700 degrees Celsius, inclusive of all ranges and values therebetween (e.g., about 650 degrees Celsius) for a predetermined time (e.g., 10, 20, 30, 40, 50, 60, 70, 80, 90, 100, 200, 300, 400, 500, 600, 700, 800, 900, or 1,000 hours, inclusive of all ranges and values therebetween) in the presence of 0.1-20% water vapor.

At 306, the SCR catalyst is formed from the raw materials. For example, an ion-exchange process, dehydration and/or other processes may be performed to form the SCR catalyst (e.g., the SCR catalyst 152) from its constituent raw materials. In some embodiments, the processes of operation 304 may be performed after the SCR catalyst has been formed from its constituent raw materials, i.e., hydrothermal aging is performed after operation 306. In various embodiments, the hydrothermal aging may be performed before, during and/or after an ion-exchange process used to form the SCR catalyst 152.

At 308, the SCR catalyst is calcined, for example, exposed to a temperature of greater than 500 degrees Celsius (e.g., up to 800 degrees Celsius) to calcify the SCR catalyst 152. In some embodiments, hydrothermal aging may be performed after calcining, i.e., the processes of operation 304 are performed after operation 308. In other embodiments, the calcining process may be adapted to perform hydrothermal aging during the calcining process.

At 310, the SCR catalyst is formed into the SCR system 150. For example, the SCR catalyst 152 is formed into a monolith core that is inserted into a can to form the SCR system 150.

Figure 8:
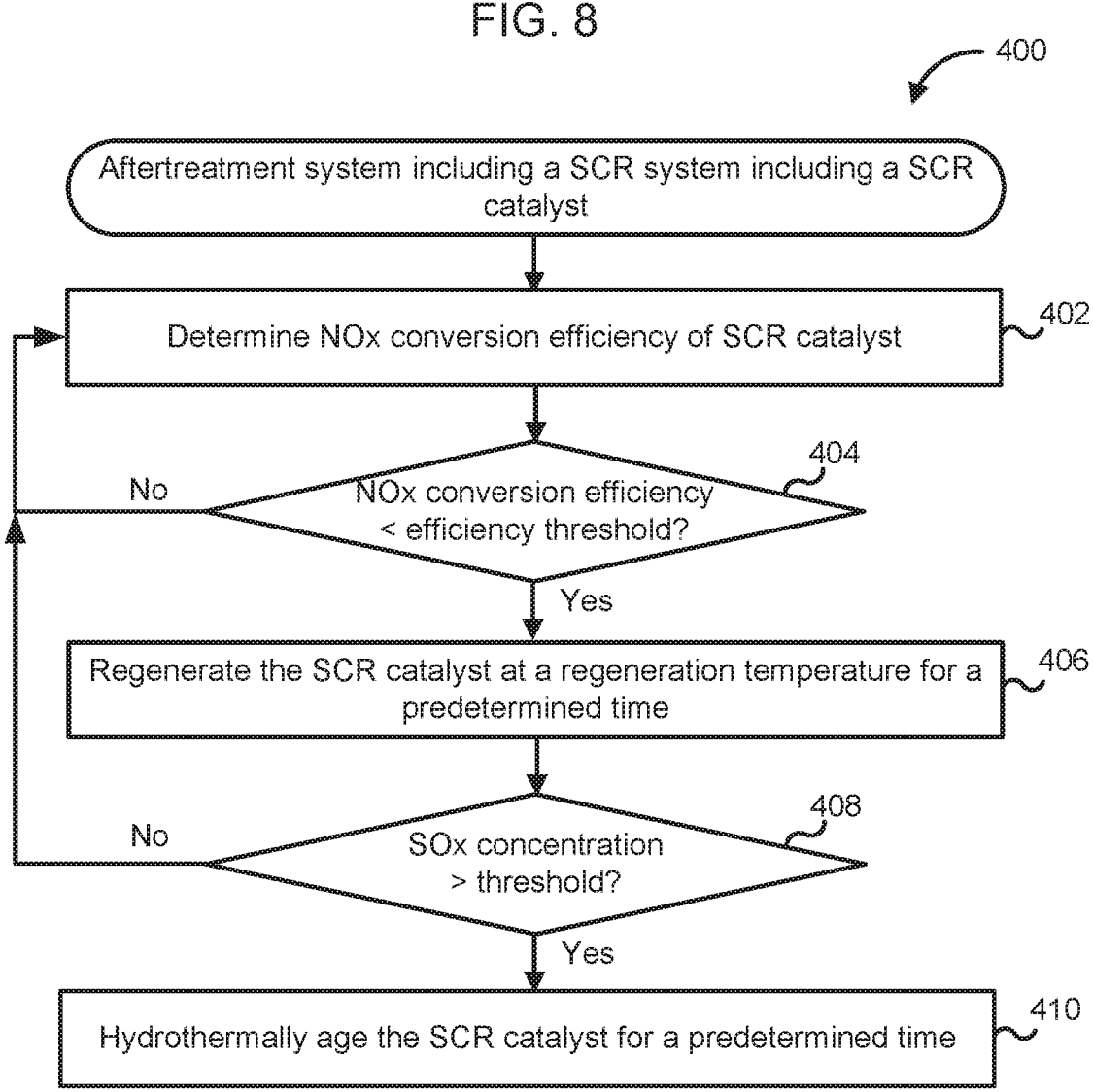
FIG. 8 is a schematic flow diagram of a method for aging a SCR catalyst included in a SCR system of an aftertreatment system during operation of the aftertreatment system, according to an embodiment.

FIG. 8 is a schematic flow diagram of another example method 400 for hydrothermally aging a SCR catalyst (e.g., the SCR catalyst 152) included in an SCR system (e.g., the SCR system 150) of an aftertreatment system (e.g., the aftertreatment system 100) during operation of the aftertreatment system, according to an embodiment.

The method 400 includes determining a $NO_x$ conversion efficiency of the SCR catalyst, at 402. For example, the $NO_x$ conversion efficiency determination circuitry 174a determines the $NO_x$ conversion efficiency of the SCR catalyst 152, for example, based on $NO_x$ signals received from the first sensor 103, and the second sensor 105.

At 404, the method 400 includes determining whether the $NO_x$ conversion efficiency is less than an efficiency threshold. If the $NO_x$ conversion efficiency of the SCR catalyst is greater than the efficiency threshold (404: NO), the method 400 returns to operation 402. In some embodiments, the efficiency threshold may correspond to a 90% $NO_x$ conversion efficiency. In response to the $NO_x$ conversion efficiency being less than the efficiency threshold (404: YES), the SCR catalyst is regenerated at a regeneration temperature for a predetermined time, at 406. For example, the temperature control circuitry 174c may generate a temperature signal configured to activate the heater 158 to heat the SCR system 150 to a regeneration temperature (e.g., 550 degrees Celsius), or the hydrocarbon insertion control circuitry 174d may generate a hydrocarbon insertion signal that commands the hydrocarbon insertion assembly 132 to insert hydrocarbons into the oxidation catalyst 130 causing the hydrocarbons to combust and increase the temperature of the exhaust gas to the regeneration temperature, in some implementations.

At 408, the method 400 includes determining whether a concentration of $SO_x$ gases in the exhaust gas is greater than a threshold (e.g., 1 ppm). For example, the $SO_x$ concentration determination circuitry 174b may determine an amount of $SO_x$ gases in the exhaust gas flowing through the exhaust gas, for example, based on a $SO_x$ signal received from the first sensor 103, or from an amount of sulfur present in the fuel consumed by the engine 10 determined by the sulfur sensor 12.

If the concentration of $SO_x$ gases in the exhaust gas is less than the threshold (408: NO), the method 400 returns to operation 402. In response to the concentration of $SO_x$ gases in the exhaust gas being greater than the threshold (408: YES), the SCR catalyst is hydrothermally aged for a predetermined time, at 410. For example, the temperature control circuitry 174c may generate a temperature signal configured to heat the SCR system 150 to the aging or hydrothermal aging temperature (e.g., greater than 500 degrees Celsius). Furthermore, the hydrocarbon insertion control circuitry 174d may generate a hydrocarbon insertion signal configured to cause the hydrocarbon insertion assembly 132 to insert hydrocarbons into the exhaust gas, the hydrocarbons combusting to produce water vapor for hydrothermal aging. In other embodiments, a water insertion assembly (e.g., the water insertion assembly 134) may be used to insert water vapor into the exhaust gas for performing the hydrothermal aging. This aging or hydrothermal aging is subsequent to the hydrothermal aging of the SCR catalyst 152 before the SCR system 150 is installed into the aftertreatment system 100. The hydrothermal aging may be performed after each regeneration process for short periods of time (e.g., in a range of 5-10 minutes) or for a longer time (e.g., 1-2 hours) after a predetermined number of regeneration event have occurred.

It should be noted that the term "example" as used herein to describe various embodiments is intended to indicate that such embodiments are possible examples, representations, and/or illustrations of possible embodiments (and such term is not intended to connote that such embodiments are necessarily extraordinary or superlative examples).

As used herein, the term "about" generally mean plus or minus 10% of the stated value. For example, about 0.5 would include 0.45 and 0.55, about 10 would include 9 to 11, about 1000 would include 900 to 1100.

The term "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements; values of parameters, mounting arrangements; use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes, and omissions may also be made in the design, operating conditions, and arrangement of the various exemplary embodiments without departing from the scope of the present embodiments.

While this specification contains many specific implementation details, these should not be construed as limitations on the scope of any embodiments or of what may be claimed, but rather as descriptions of features specific to particular implementations of particular embodiments. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

What is claimed is:

1. A method for enhancing sulfur resistance of a selective catalytic reduction (SCR) catalyst, comprising:
    providing raw materials of the SCR catalyst;
    heating the raw materials to a temperature greater than 500 degrees Celsius for a predetermined time in the presence of water vapor to age the raw materials;
    forming an aged SCR catalyst from the aged raw materials;
    calcining the aged SCR catalyst;
    providing a matrix;
    applying the aged SCR catalyst on a first portion of the matrix; and
    applying a non-aged SCR catalyst on a second portion of the matrix downstream of the first portion.

2. The method of claim 1, wherein the aged SCR catalyst comprises a metal-zeolite catalyst.

3. The method of claim 1, wherein the temperature is about 650 degrees Celsius.

4. The method of claim 1, wherein the heating of the raw materials comprises flowing a gas through the raw materials, the gas having a temperature greater than 500 degrees Celsius.

5. The method of claim 1, wherein the forming of the aged SCR catalyst includes performing an ion-exchange process, and wherein the heating of the raw materials is performed one of before, during or after the ion-exchange process.

* * * * *